United States Patent
DeGolia, Jr.

(10) Patent No.: US 6,512,763 B1
(45) Date of Patent: *Jan. 28, 2003

(54) METHOD AND APPARATUS FOR DATA ROUTING, DELIVERY, AND AUTHENTICATION IN A PACKET DATA NETWORK

(75) Inventor: Richard Case DeGolia, Jr., Los Altos, CA (US)

(73) Assignee: Genesys Telecommunications Laboratories, Inc., Daly City, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 09/524,768

(22) Filed: Mar. 14, 2000

Related U.S. Application Data

(62) Division of application No. 09/146,630, filed on Sep. 3, 1998, now Pat. No. 6,181,692.

(51) Int. Cl.[7] .............................................. H04L 12/66
(52) U.S. Cl. ...................................... 370/352; 370/238
(58) Field of Search .............................. 370/238, 230, 370/351, 352; 707/201; 709/229

(56) References Cited

U.S. PATENT DOCUMENTS

| | | | |
|---|---|---|---|
| 5,398,012 A | * | 3/1995 | Derby et al. ............... 370/238 |
| 6,034,946 A | * | 3/2000 | Roginsky et al. ........... 370/238 |
| 6,058,399 A | * | 5/2000 | Morag et al. ............... 707/201 |
| 6,185,619 B1 | * | 2/2001 | Joffe et al. .................. 709/229 |
| 6,314,092 B1 | * | 11/2001 | Reeve ......................... 370/351 |
| 6,347,078 B1 | * | 2/2002 | Narvaez-Guarnieri et al. ... 370/230 |

* cited by examiner

Primary Examiner—Zarni Maung
Assistant Examiner—Jungwon Chang
(74) Attorney, Agent, or Firm—Donald R. Boys; Central Coast Patent Agency, Inc.

(57) ABSTRACT

A server connected to a data network for transmitting files over the data network to one of a plurality of destination servers is adapted to spawn a software agent in response to a file to be transmitted and meeting certain preset criteria, such as file size. The software agent is associated with the file by at least the file's destination, and is transmitted over one or more routes to the destination to collect routing information, and returns to the source server. The associated file is then transmitted using the information collected. In an alternative embodiment the agent also collects validation information at the destination and returns same to the source server. The agent may also, in some embodiments, negotiate reserved bandwidth and security protocols or other validation information for transmission of the associated file at certain intermediate servers.

13 Claims, 3 Drawing Sheets

METHOD AND APPARATUS FOR DATA ROUTING, DELIVERY, AND AUTHENTICATION IN A PACKET DATA NETWORK

RELATED U.S. APPLICATION DATA

This application is a Division of application Ser. No. 09/146,630, filed on Sep. 3, 1998, now U.S. Pat. No. 6,181,692.

FIELD OF THE INVENTION

The present invention is in the field of data routing and delivery over a packet protocol data network, and pertains more particularly to methods and apparatus for determining the best direct routing and transport of such data over such networks.

BACKGROUND OF THE INVENTION

The present invention pertains to data networks wherein data is packaged and transmitted as packets. The best known current example of such systems is the well-known Internet, used by large numbers of people and organizations for such as Internet mail delivery, proprietary data-file transfer systems, and other known data transfer services. Typically, a subscriber wishes to send information to another subscriber to a service connected to such a network. Such a service may be an e-mail service provider, a chat and data-file transfer service provider, or any other data transport service provider wherein both clients involved in a transaction subscribe and maintain and use the appropriate and compatible software programs enabling such file transfer. Such applications are adapted to communicate over a data network according to various protocols. The Internet is used extensively in this specification as an example of such a network wherein sometimes quite large data files are routinely transported over long distances. Also, systems compatible with the Internet are conventionally termed Internet protocol (IP) systems, and this terminology is used herein as well.

E-mail service providers are a good example of such services that one may subscribe to in order to send and receive data over the Internet. E-mail service providers typically provide all of the hardware and software required to operate their service, and are typically a part of an Internet Service Provider's services. For example, a plurality of e-mail servers may be geographically distributed throughout the Internet at locations where local clients may dial-up a server and retrieve or send mail, which may include file attachments. Client software applications are generally configured to communicate with a server or servers local to the clients Internet service provider (OSP) through which the client connects to the network.

Proprietary file-transfer services use servers typically as described above. For example, IP phone programs, International Chat or file transfer applications, business networking programs, Internet video rental programs, genealogy programs, and a host of others use various systems of distributed servers. Such servers may or may not be owned by the service provider. In some cases servers are leased with more than one service provider possibly sharing one server. In many cases several servers are available to one client application as is the case with many business network applications.

Routing of data over an IP network is generally from one node to another node or from one server to another server wherein the next route-to destination address is, in many cases, the address of a next server closer to the final destination. Routers in the network are equipped with routing tables that contain information about different routes or paths through the network leading toward the final destination. A data file to be transmitted first resides in the client's local system, and is typically uploaded to an Internet-connected local server for routing. The local server may negotiate under such protocols as RSVP a route to a next server that is closer to the intended destination, and so on, until the data arrives at the end server which stores the information for retrieval by the receiving client. As the terminology packet implies, data to be transmitted is packaged as a series of packets, including accompanying identification and data, and the packets for a particularly large block of data may or may not follow the same route. At the destination end, separate packets are reorganized into a copy of the original file.

Depending on the distance from a sending client to a receiving client, there may be many servers which must store the data file and negotiate routes to a subsequent server before the data file may be sent on. These segments wherein the message or data file pauses are known as hops in the art. For example, for a data file to move from a source server to an end server, many pauses or hops may be experienced along the way. A gateway router linking two separate networks would comprise one hop and so on.

A problem with the current art is that large files may take a much longer time to arrive at the intended destination than a small file. Many companies place constraints on the data size of single transfer events because of limited storage space available in servers and during periods of heavy network traffic. Server storage capacities can be taxed if many large files are being stored while waiting on further routing instructions. Servers can sometimes become overloaded with data and crash, hence the phrase in the art, the server is down. Also, random distribution of packets may cause weak links in an unbalanced system to get clogged up, which can lead to the loss of packet, which ultimately leads to additional routing attempts, which in turn leads to more congestion.

As described briefly above, a large data file is broken down into many smaller data packets for transport. Each data packet contains the appropriate addressing information required to facilitate routing. Because data files travel as data packets, large data files comprising many packets take much longer to transport than small files comprising only a few packets. If a server goes down while a large file is being transferred, some of the file may not arrive, causing further delay when the server is up again. Those with skill in the art of IP network data-transfer will readily understand that much improvement is needed in the way data routing is accomplished over a large and busy IP network.

What is clearly needed is a method and apparatus that will greatly facilitate transfer of large blocks of data or data streams over packet-style data networks.

SUMMARY OF THE INVENTION

In a preferred embodiment of the present invention a method for expediting transmission of data in a packet-oriented data network is provided, comprising steps of (a) spawning an executable software agent associated with the data at a source system; (b) providing the software agent with at least minimal destination information for the data; (c) transmitting the agent in lieu of the data associated with the agent by one or more routes to the destination; (d) collecting information on the one or more routes by the agent at nodes along the one or more routes to the destination; and (e) determining a best route using the information collected by the agent.

In an alternative embodiment there is a further step (f) for transmitting the data associated with the agent to the destination by the best route determined in step (e). In some instances the data associated with the agent is stored at the source server while the agent is spawned and exercised. In other instances the data associated with the server is stored at a client's station connected to the source server, and the client's station notifies the source server of the presence of data to be transmitted, and wherein the data is uploaded to the source server only after the agent process is complete.

In other alternative embodiments the agent collects validation information at the destination server, and returns the validation information to the source server.

In another aspect of the invention an enhanced Internet-connected source server is provided, comprising an Internet port; at least one connected client station; and a code set adapted to spawn a software agent enabled to travel the Internet and to collect information regarding the routes traveled. The software agent (i) is spawned in response to data to be transmitted by the source server to a destination, (ii) is associated with the data by at least the data's destination, and (iii) is sent in lieu of the data by various routes to the destination before the data is transmitted. The routing information that is collected by the agent is used in transmission of the data.

In some embodiments the data to be transmitted is held at the client station, the client station sends a request for an agent to the source server, and the source server spawns the agent in response to the request from the client station. In some cases the agent is spawned in response to data being uploaded from the client station to the source server, according to preset criteria concerning the data. In other instances the spawned agent is enabled to negotiate reserved bandwidth for the associated data at intermediate servers. Also in some embodiments the spawned agent is enabled to establish validation of recipient at the destination, and to provide the validation to the source server.

In yet another aspect a system for data transmission is provided, comprising a source server having a first port to a data network; a destination server having a second port to the data network; and a set of one or more routes through intermediate stations from the source server to the destination server. In this embodiment the source server is adapted to spawn a software agent in response to and associated with data to be transmitted from the source server to the destination server, the data meeting preset criteria, and to send the agent by more than one of the one or more routes to the destination server, and wherein the agent is adapted to collect data on the alternative routes traveled.

In some embodiments of the system the source server uses the information collected by the agent to route the associated data to the destination server. In others the agent is further adapted to negotiate validation information regarding destination at the destination server, and to return the validation information to the source server.

Software agents transmitted in lieu of data provide a way, for the first time, to select a best-fit route for data to a destination, and also to obtain secure and accurate destination validation. Accordingly, an agent can arrange with specifically anticipated or encountered servers for highly secure transmissions of extremely proprietary data if the agent can identify and negotiate the necessary protocols and passwords. Methods and apparatus for accomplishing the invention are described in enabling detail below.

BRIEF DESCRIPTION OF THE DRAWING FIGURES

DESCRIPTION OF THE PREFERRED EMBODIMENTS

Figure 1:
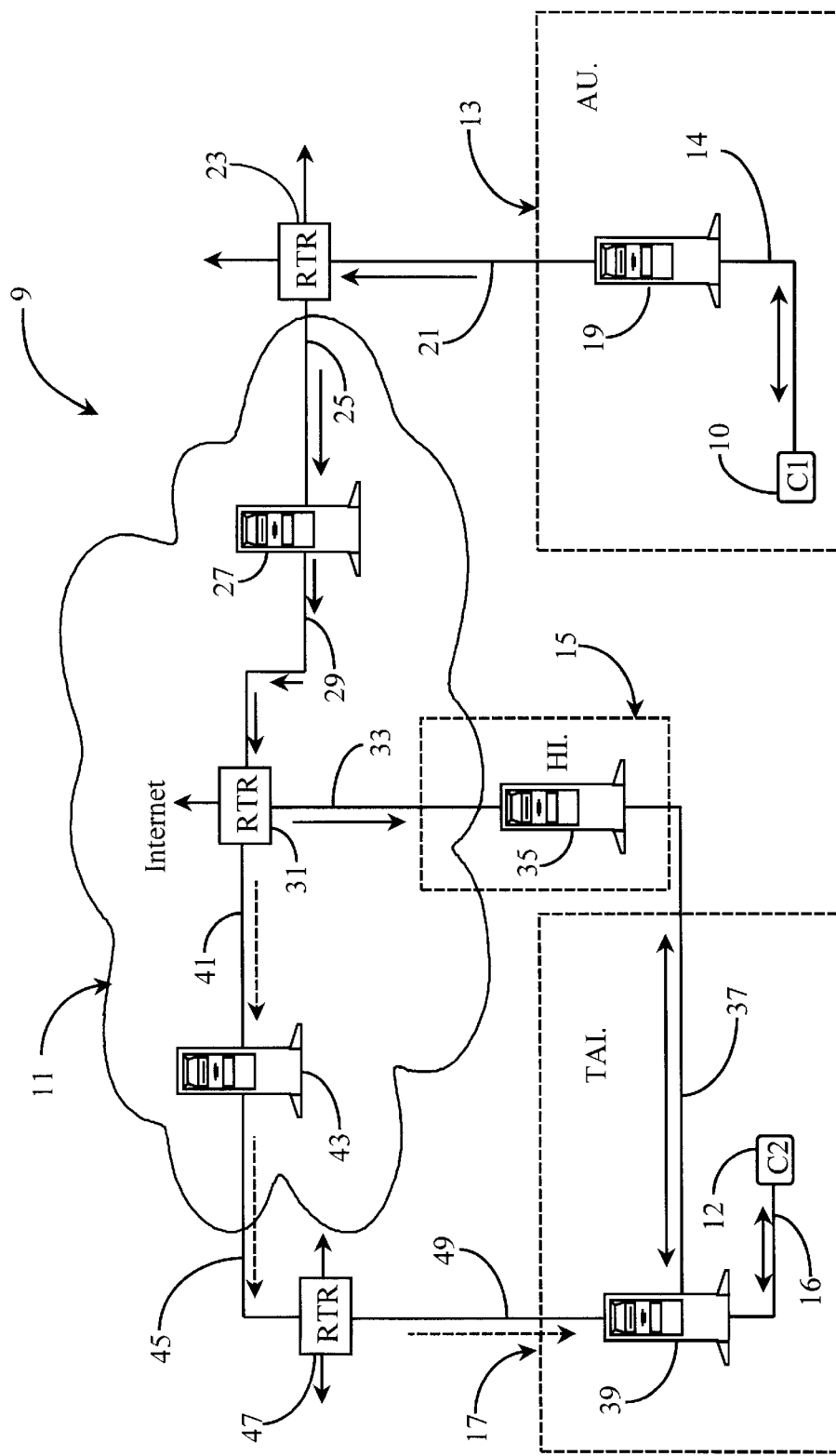
FIG. 1 is a system overview of a data-transfer network and server connection scheme according to prior art.

FIG. 1 is a system overview of a data-transfer network and server connection scheme according to conventional art. In this example, a simple network architecture 9 is illustrated. Network architecture 9 comprises IP network 11, hereinafter referred to as Internet 11, and three geographically separated host networks or regions 13, 15, and 17. Region 13, in this example, represents a portion of the network in, for example, Australia while regions 15 and 17 represent the same in, for example, Hawaii and Thailand respectively.

Internet 11 may be any type of packet network, including IP networks as known in the art such as a private wide area network (WAN), a corporate Intranet, a system of linked but separate WAN's, and so on. Regions 13, 15, and 17 may be sub-nets. linked WAN's, part of Internet 11, and so on. It will be appreciated that such a large network as Internet 11 may be linked to many separate networks and sub-nets wherein Internet access is routine. Such segments or sections or regions may be incoherent network segments for which there is a need to prepare a smooth and coherent path for dta transmission. Such incoherence may be due to different protocols for QOS, different, rules for QOS, different ownershipand so on.

Region 13, in Australia in this example, comprises a local server 19 shown connected via link 14 to a client 10, also illustrated as C1. Link 14 represents the connection client 10 has to server 19 when sending or receiving mail or other data depending on the type of delivery service used of which there are many possibilities, as described above in the background section. In this example, client 10 operates a personal computer having access to Internet 11 through normal Internet Service Provider (ISP) connection as is known in the art. In another example client 10 may be operating on a local area network (LAN) which is connected to Internet 11 through an Internet-connected server on the LAN.

Region 17, in Thailand, comprises a local server 39 and a client 12, also illustrated as C2. Client 12 is linked to server 39 via network connection 16 encompassing the same parameters as were described with respect to client 10 in region 13. Client 10 is enabled to communicate with client 12 through Internet 11 as aided via distributed servers and routers as illustrated herein.

Region 15, in Hawaii, comprises a server 35, however, no client is illustrated, although there may be clients connected to server 35. Each distributed server 39, 35, and 19 are owned or leased by an information-delivery system such as described in the background section. Similarly, each described server is connected to one of a plurality of distributed routers. For example, server 19, in region 13. is connected to a router 23 via a network connection 21. Server 35, in region 15, is connected to a router 31 via a network connection 33. And server 39, in region 17, is connected to a router 47 via a network connection 49. Two additional servers, servers 43 and 27 are illustrated in Internet 11 and represent either secondary information servers, or, perhaps client servers representing additional regions. Similarly, directional arrows shown emanating from routers represent routes to other parts or regions of Internet 11.

It will be apparent to one with skill in the art that there will be many more servers, routers, and network connections in a network such as to Internet 11, however, the inventor is satisfied that those illustrated are sufficient for the purpose of explaining the basic prior art. It will also be apparent to the skilled artisan that in many instances servers and routers are combined in function and are not necessarily physically separated. However, the inventor chooses to separate these functions for exemplary purposes only.

As briefly described in the background section, routing is accomplished over a network as aided via servers, routers and so on. The following illustrates a simple routing process.

Client 10 connects to Internet 11 via connection 14 in order to send a message or data file to client 12. Client server 19 stores the message or data file sent from client 10 and waits for routing instruction. Router 23 is notified by server 19 and uses a lookup table to determine that server 27 is a logical first stop for the message on it's way to it's ultimate destination. Therefore, the file is routed to server 27 via connection 21 router 23 and connection 25.

Server 27 receives and stores the file temporarily while awaiting farther instruction from router 31. The routing table in router 31 indicates two possible routes to server 39 which is the end destination for the file. One route may shorter than the other. For example, network connection 33 directly links router 31 to server 35 in region 15 (Hawaii). Server 35 is directly linked to server 39 (end server) via network connection 37 with no additional router to consult such as router 47 shown in line of the longer route. Therefore, server 35 is the next logical destination for the data file.

The longer route, comprising a network connection 41, server 43, router 47, and a network connection 49 to server 39 is not chosen unless required because of a constraint in the system such as server 35 is down, etc. Generally, the shorter route is taken as may be determined via router 31, which may be using one or a combination of many possible IP routing protocols such as are known in the art.

It will be appreciated by one with skill in the art that there are differing types of routers and servers that may be dedicated to performing different functions within an IP network, or system of linked but separate networks. For example, router 31 may be dedicated to routing within the same network whereas router 47 may be a gateway-route to a separate network. Regardless of the dedicated purpose of each node, an IP address is assigned to each connected router and server and communication among them is possible according to prescribed protocol.

This prior art example described herein assumes the shortest quickest route from client 10 to client 12 encompasses six nodes, servers 39 and 19 included, wherein the file may be stored, or consultation may take place for further routing. It should be appreciated then, that in actual practice wherein many hundreds of nodes may be encountered, a large file comprising many packets may experience considerable delay and risk factor when being sent over such distance as herein illustrated. Server overload, file transfer time-outs, network congestion problems, and the like all play a role in such delays. Also, on top of those "natural" congestion factors, there are others imposed by local network management rules, QOS management etc. that can affect the usual least-cost route.

Therefore, it is an object of the present invention to provide a software routing agent that is quite small in terms of packet size. This software routing agent, hereinafter termed agent, may be dispatched to a selected destination server over all conventionally chosen routes, and, because of it's small size, may return to the client quickly with information regarding the best routing. It may also have to negotiate in one or more regions special rights, against pay or other equitable exchanges. The agent may, for example, offer payment, service exchange or other value in order to receive better routing and or bandwith other than least-cost routing (smooth path).

In a preferred embodiment of the present invention detailed more fully below, the agent is operated via computer enhanced-servers, executing instances of software known to the inventor, as T-servers on said computers and including intelligent routing software, which are placed in a distributed fashion throughout the network and connected to existing servers and routers for the purpose of enabling the agent in it's functionality. In other instances, simply RSVP-enhanced routers are used, or just even any other kind of server or routers may be used. Similarly, there are many other protocols and methods, by which a router or routing server may be controlled and any of those should be able to substitute.

The agent of the present invention, according to various embodiments, may, in addition to collecting and providing routing instructions to source servers, also insure guaranteed bandwidth using known protocols over certain routes and give certain instruction to intermittent nodes (routers/servers) that are enhanced according to embodiments of the present invention, by the method of local negotiation, for example, or in some cases by negotiating from a neighboring region (not shown). In a further aspect, described more fully below, the agent may also provide security services, such as validation of source and/or destination, by delivering and requesting at the destination, and returning to source, prior to transmission of a file, certificates encoded with keys, passwords, and the like.

Figure 2:
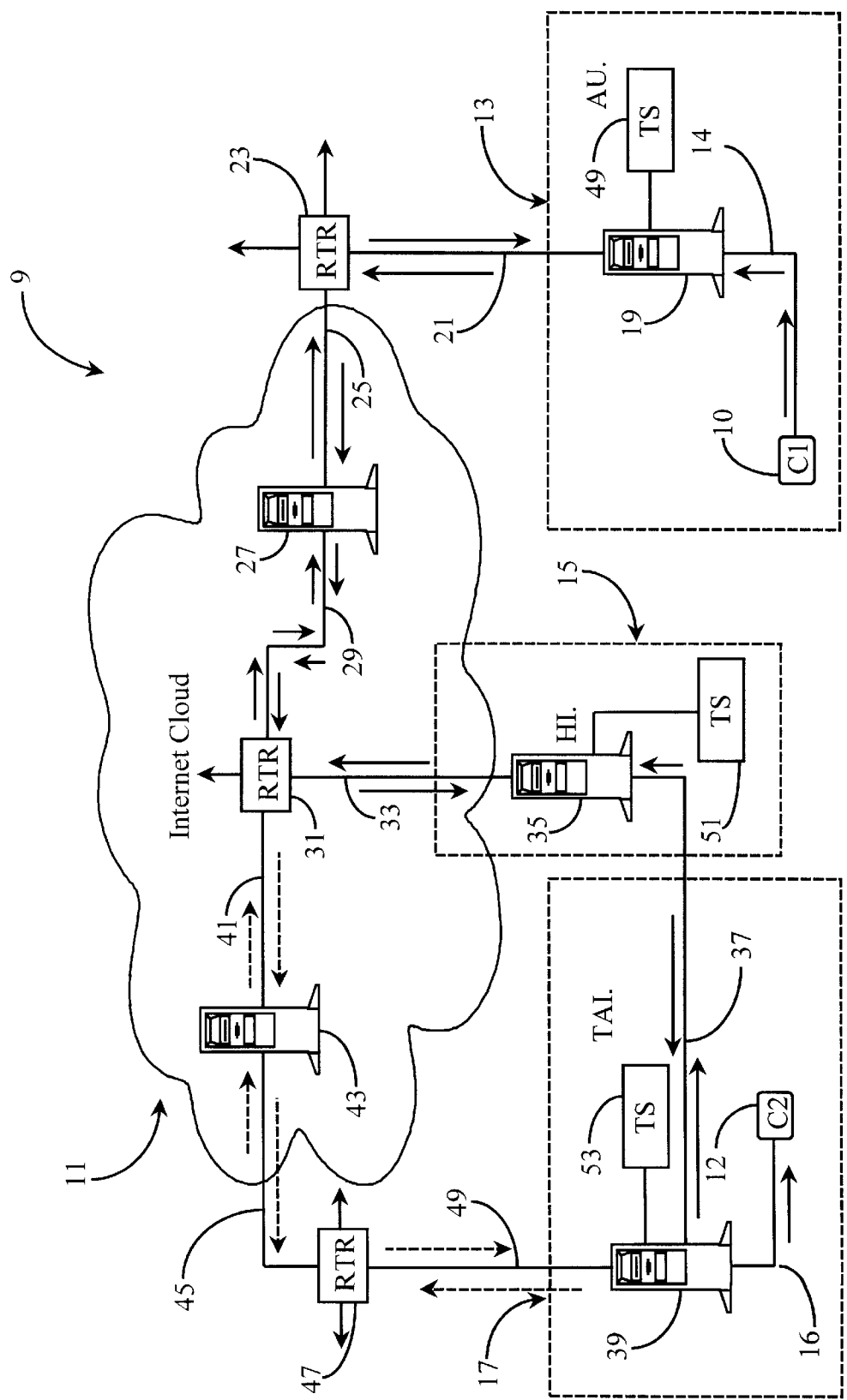
FIG. 2 is a system overview of the data-transfer network and server connection scheme of FIG. 1 enhanced with routing information collecting and reporting capability according to an embodiment of the present invention.

FIG. 2 is a system overview of the data-transfer network and server connection scheme of FIG. 1 enhanced with routing information collecting and reporting capability according to an embodiment of the present invention. In an effort to save space and to avoid redundancy, elements of FIG. 2 that were introduced in the prior art example of FIG. 1 will not be re-introduced even though they may be enhanced according to an embodiment of the present invention. Such enhancements made will be described with respect to each element. Only new elements in FIG. 2 that are not found in FIG. 1 are introduced formally.

According to an embodiment of the, present invention, network architecture 9 is enhanced via addition of processors running instances of computer-enhancement software known to the inventor as T-servers. For simplicity's sake the processor and its software together is referred to here as a T-Server. T-server (TS) 49 is linked to client server 19 in region 13. TS implementation is similarly illustrated in regions 15 and 17 via the addition of TS server 51 linked to server 35 and TS server 53 linked to server 39 respectively. It should be noted here that T-server enhancement is made via software routine such as may be integrated with existing network server/router software and not specifically accomplished with the addition of hardware. The inventor simply shows TS 53, 51, and 49 to be separate for the sole purpose of illustration. It should be also noted that instances of T-server may also reside in servers 43 and 27, as well as, routers 47, 31, and 23. Signaling and control functions between those T-servers are typically transmitted over the same network as data, but may in some instances, for security, safety or redundancy be transmitted over a separate network, not shown here for simplicity reasons. Also, any other kind of platform other than T-Server may be used to help such software agents.

Using the same process example that was used with respect to FIG. 1, client 10 intends to send a data file to client 12 over network 11, which in this case, is the Internet. Client server 19 is now enhanced via TS 49 which spawns and provides a software routing agent to server 19 upon request. A request for an agent may depend on a number of parameters, such as file size. For example, a file originating from client 10 to be uploaded to and transmitted by server 19 may exceed a preset threshold, causing server 19 to initiate a request to TS 49 for an agent.

The agent may be of the form of a Java applet or other network executable file that may be adapted to perform various described functions according to embodiments of the present invention. Techniques used in building or constructing such an agent will not be detailed here as such functional files are known in the art and to the inventor, albeit for entirely different purposes and functions than taught,herein. Rather it is the use and application of the constructed agent that is particularly inventive as will be shown below.

Referring back to FIG. 2, TS 49, upon detecting a request for processing a file from a client, the file falling within then parameters defined for spawning an agent, supplies the agent to server 19 for the purpose of determining routing for the associated file, before the file is transmitted. In a preferred embodiment, an enabled client, having a file to be preferably transmitted according to the precepts of the present invention, sends a special request to the local server. In other embodiments, the local client may simply upload the file, and the local server detects the need for an agent, and stores the file until the agent functionality is provided.

In a simple embodiment, the agent is sent "round trip" to the file's destination address as a normal data packet would be sent while the associated file is held at client 10. The destination address for the file as well as the source or return address is known to the agent upon departure. Other information may be known to the agent as well, such as size of the associated file, IP addresses of enhanced intermittent servers/routers, and in some embodiments, certificate of origin and destination information.

In some embodiments, a Resource Reservation Protocol (RSVP) client, or other bandwidth-reserving client (aka QOS=Quality of Service), such as known in the art, may also be carried by the agent. Passwords, keys, impending file descriptors and other like information such as certificates etc. may be sent with the agent as deemed appropriate. A principle function of the agent is to return to the client with the best available route instructions to the destination for the file.

In this example, the agent travels first from server 19 to router 23 via connection 21, then to server 27 via connection 25 and to router 31 via connection 29. Only one route is shown available up to the point of router 31. However, when the agent arrives at router 31, there are two possible routes presented to server 39 in region 17. In actual practice there may be many more. Similarly, directional arrows shown emanating from routers represent routes to other like equipment in other parts of Internet 11.

Because the agent is small, it travels very fast compared to a large file comprising many data packets. Therefore, it may travel both routes (and many other routes) to collect data regarding each route. While router 31 may have both routes (typically more) listed in it's routing table, such tables are only periodically updated, and may not list certain conditions discoverable by the agent such as temporary network congestion, available bandwidth over certain portions of the network, and so on. Therefore, the agent may be instructed to travel all the listed routes to the file destination instead of trusting the information provided by routing tables.

Server problems, preset constraints, broken connections, network failures and the like may also influence the agent's choice of route. Hence, the shortest route listed in a router's table may not be the best route for a very large file. Such additional information may also help the agent to break a tie. For example, two routes are equivalent in length and bandwidth but one is congested, etc.

As can be seen in this example, the agent travels first from router 31 over connection 33 to server 35, and over connection 37 to server 39. The agent then returns to router 31 and makes a second trip, as illustrated via dotted arrows, along connection 45 to router 47, and over connection 49 to server 39. The agent, having traveled all routes to server 39, returns to router 31, and back through the network to client server 19. The best route for the file to be sent is reported to server 19 which may then prepare and send the file accordingly, or, in the case of the file being held at the client, such as client 10, initiate uploading of the file, then prepare and transmit the file. In some embodiments, priority may be appended to files as well, and low-priority files may be held for improved transmission conditions.

In one embodiment of the present invention, the agent is adapted to clone itself if presented with an unusually large number of routing loops to the target destination from one point or node. In this embodiment, the agent may become a plurality of dedicated agents with each clone assigned a certain number of listed routes from a table. When the agents return to that point, which in this case is router 31, then they may converge or merge back into one agent for the trip back to server 19, with data collected by the several agents entrusted to the one.

Depending upon the level and number of TS enhancements provided to servers and routers within a given IP network, an additional embodiment becomes possible according to the spirit and scope of the present invention. This alternative embodiment allows data files to avoid intermittent servers. To further illustrate this more involved embodiment, consider that servers and routers along with other dedicated network equipment are typically either leased or owned by service providers who, in turn, sell their data-based services to clients. Such a provider, in many cases, is a large international organization or, in effect, a communications giant. Such a large organization can provide TS enhancement to many hundreds of servers and routers making up their regional network. Therefore, it is possible, at least in one embodiment, to enhance servers and routers along the variable network routes to allow large files to pass through without being stored if instructed by an agent of the present invention. That is, after the agent has traveled the routes, and has reported back to the client with the best route available, the servers along that route are instructed not to hold the agent associated file for additional instruction or other reasons until it reaches it's destination. This effectively eliminates hops or node delays along a chosen route thereby expediting transfer of the file, and reducing load to intermittent servers. The embodiment as just described may require an open through-connection or bridge to be installed and maintained in each affected node. Perhaps only those agent-associated data files may pass over the bridges as instructed via TS enhancement.

Other embodiments may include routing according to additional rules such as RSVP etc., constraint routing wherein certain routes are prohibited according to certain prevailing network conditions, and so on.

Figure 3:
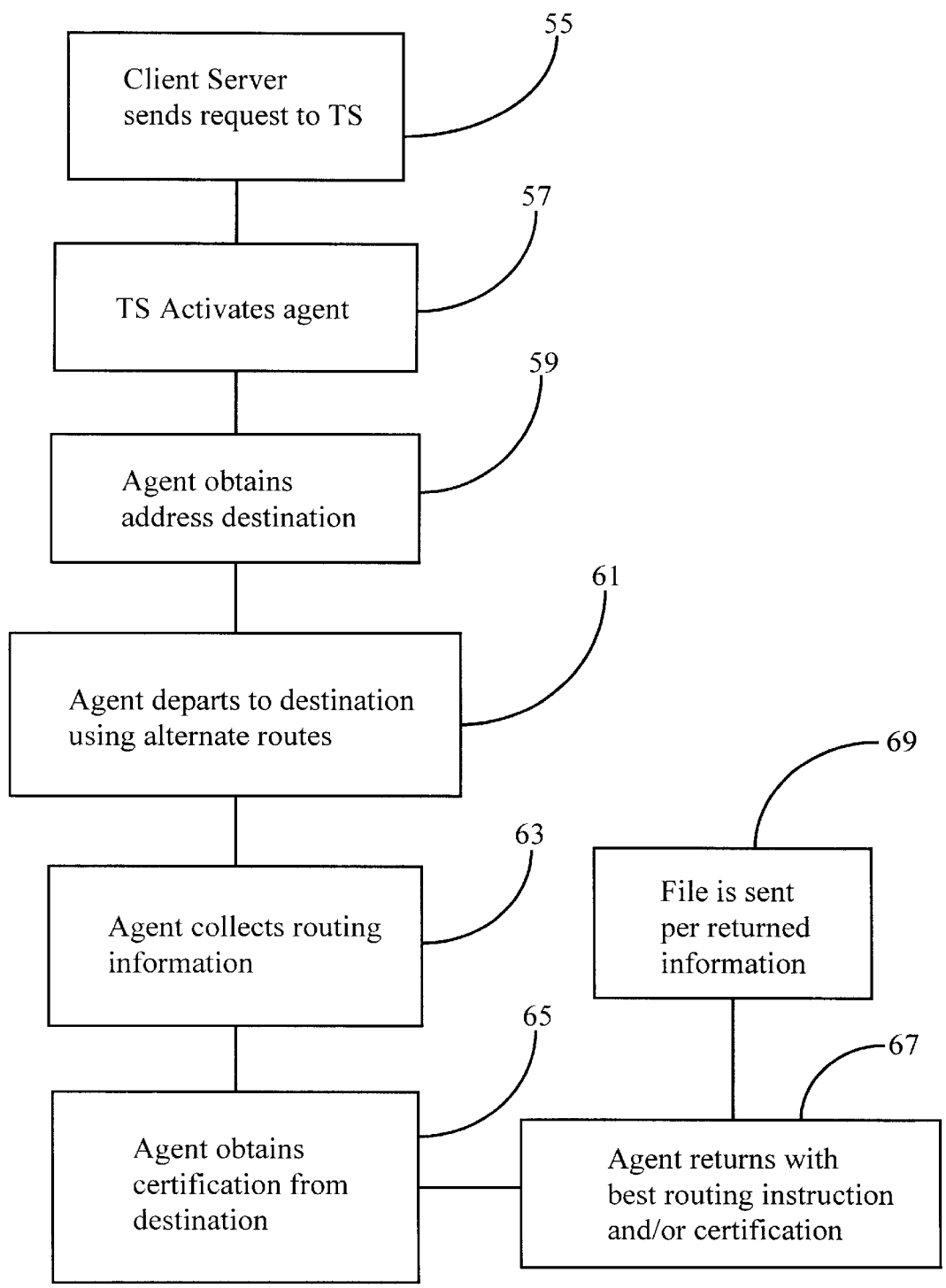
FIG. 3 is a software flow diagram illustrating process steps taken by a routing agent according to an embodiment of the present invention.

FIG. 3 is a flow diagram illustrating steps taken by a routing agent system according to an embodiment of the present invention. FIG. 3 is meant to show only one example of many possible examples of process steps that may be involved in agent-information routing according to an embodiment of the present invention.

In step 55, a client server such as server 19 of FIG. 2 receives a file or a request associated with a file for transport from a client such as client 10 of FIG. 2. If it is determined that the file warrants agent information routing, a request for an agent is sent to TS such as TS 49 of FIG. 2. TS spawns and activates the agent in step 57 and associates the agent with the target data file. In step 59, the agent obtains required information associated with the file. This may include, but is not limited to destination addressing, source address, file size, file descriptors, and so on.

In step 61, the agent is sent to the destination address using variable routes as described with reference to FIG. 2. In step 63, the agent collects routing information as it travels. Other information may also be collected during this step such as network conditions along certain routes, certification parameters, RSVP information, if available, and so on. In step 65, in some embodiments, the agent obtains certification from the destination as well as other information that may be pertinent. The end server may, in one embodiment, be adapted to notify a receiving client of the incoming file along with a brief description of the file.

At step 67, the agent has returned to the source server and has supplied information required to effect routing of the file along a chosen route. In step 69, the file is sent to the end server based upon the information received in step 67.

It will be apparent to one with skill in the art that the process steps illustrated herein may vary according to differing network situations which may be encountered, and of course, upon the level of functionality afforded to the software agent. Likewise, by increasing TS enhancement to nodes widely over the network many more and varied process steps may be evident as applied to more functional embodiments of the present invention.

It will further be apparent to one with skill in the art that the method and apparatus of the present invention may be applied to more than one or a combination of several types or classifications of IP networks without departing from the spirit and scope of the present invention such as on the Internet, an Intranet, a system of linked but separate networks, and so on. There are many other embodiments, many of which have already been described. The spirit and scope of the present invention is limited only by the following claims.

What is claimed is:

1. A method for expediting transmission of data to a destination in a packet-oriented data network, comprising steps of:
   (a) spawning an executable software agent associated with the data at a source server;
   (b) providing the executable software agent with at least minimal destination information for the data;
   (c) transmitting the executable software agent in lieu of the data associated with the agent by one or more routes to the destination;
   (d) collecting information on the one or more routes by the agent at nodes along the alternative routes to the destination; and
   (e) determining a best route using the information collected by the agent.

2. The method of claim 1 comprising a further step (f) for transmitting the data associated with the agent to the destination by the best route determined in step (e).

3. The method of claim 1 wherein the data associated with the agent is stored at the source server while the agent is spawned and exercised.

4. The method of claim 1 wherein the data associated with the source server is stored at a client's station connected to the source server, and the client's station notifies the source server of the presence of a file to be transmitted, and wherein the file is uploaded to the source server only after the executable software agent has been spawned and exercised.

5. The method of claim 1 wherein the agent collects validation information at the destination, and returns the validation information to the source server.

6. An enhanced Internet-connected source server, comprising:

an Internet port;

at least one Internet-connected client station; and a code set adapted to spawn a software agent enabled to travel the Internet and to collect information regarding the routes traveled;

wherein the software agent is spawned in response to data to be transmitted by the source server to a destination, is associated with the data by at least the data's destination, is sent in lieu of the data by various routes to the destination before the data is transmitted, and the routing information collected by the agent is used in transmission of the data to the destination.

7. The source server of claim 6 wherein the data to be transmitted is held at the client station, the client station sends a request for an agent to the source server, and the source server spawns the agent in response to the request from the client station.

8. The source server of claim 6 wherein the agent is spawned in response to data being uploaded from the client station to the source server, according to preset criteria concerning the data.

9. The source server of claim 6 wherein the spawned agent is enabled to negotiate reserved bandwidth at intermediate servers for the data to be transmitted by the source server to the destination.

10. The source server of claim 6 wherein the spawned agent is enabled to establish validation of recipient at the destination, and to provide the validation to the source server, which validation may initiate the transmission of the file or may be used in the course of determining the routing of the data to the destination server.

11. A system for data transmission, comprising:

a source server having a first port to a data network;

a destination server having a second port to the data network; and one or more routes through intermediate stations from the source server to the destination server;

wherein the source server is adapted to spawn a software agent in response to and associated with data to be transmitted from the source server to the destination server, the data meeting preset criteria, and to send the agent by more than one of the one or more routes to the destination server, and wherein the agent is adapted to collect data on the routes traveled.

12. The system of claim 11 wherein the source server uses the data collected by the agent to route the associated data to the destination server.

13. The system of claim 11 wherein the agent is further adapted to negotiate validation information regarding destination at the destination server, and to return the validation information to the source server.

* * * * *